(12) United States Patent
Kittrell

(10) Patent No.: US 7,997,605 B2
(45) Date of Patent: Aug. 16, 2011

(54) ATV UTILITY TRAILER WITH PIVOTING AND EXTENDABLE TONGUE AND BRUSH GUARD

(76) Inventor: Floyd L. Kittrell, Jeffersonville, IN (US)

( * ) Notice: Subject to any disclaimer, the term of this patent is extended or adjusted under 35 U.S.C. 154(b) by 253 days.

(21) Appl. No.: 12/456,489

(22) Filed: Jun. 17, 2009

(65) Prior Publication Data
US 2010/0320739 A1 Dec. 23, 2010

(51) Int. Cl.
B60D 1/00 (2006.01)
(52) U.S. Cl. .................. 280/400; 280/476.1; 280/491.1; 280/656; 280/789
(58) Field of Classification Search .................. 280/400, 280/40, 476.1, 491.3, 656, 401, 638, 789, 280/42, 491.1, 639, 659, 414.1, 414.3; 414/462
See application file for complete search history.

(56) References Cited

U.S. PATENT DOCUMENTS

| 4,563,018 | A * | 1/1986 | Stage et al. | 280/402 |
| 4,603,874 | A * | 8/1986 | Merrill | 280/402 |
| 6,254,117 | B1 * | 7/2001 | Cross | 280/401 |
| 7,055,848 | B1 * | 6/2006 | James | 280/656 |
| 2002/0171224 | A1 * | 11/2002 | Iles | 280/476.1 |
| 2005/0248125 | A1 * | 11/2005 | Flynn et al. | 280/491.3 |
| 2008/0012266 | A1 * | 1/2008 | Lee | 280/424 |
| 2008/0042403 | A1 * | 2/2008 | Anderson | 280/656 |
| 2008/0157493 | A1 * | 7/2008 | McConkey et al. | 280/40 |

* cited by examiner

Primary Examiner — Kevin Hurley
Assistant Examiner — Tashiana Adams
(74) Attorney, Agent, or Firm — Carrithers Law Office PLLC; David W. Carrithers

(57) ABSTRACT

A trailer with a pivoting and extendable tongue for use with all terrain vehicles (ATV) wherein the trailer tongue connects to a standard vehicle hitch receiver providing means for pivoting the trailer up in a raised transport or storage space saving configuration supported by the ATV or other vehicle receiver. The tongue is telescoping. The wheels are provided with heavy duty fenders which can be pivotally mounted on the wheel axles to function as sled runners. Support members extend from the axles to a selected point under the trailer frame at a selected angle in front of the wheels to function as brush guards so that the wheels are not caught in brush, hung on stumps, or deep gullies. A keeper can be removed to allow the fenders to be rotated forward and down to be used as sled runners when the ATV is towing a load in the snow. The wheels are also positioned under the trailer bed to extend pass the frame to allow the trailer to be backed over objects such as logs or gullies.

6 Claims, 10 Drawing Sheets

ATV UTILITY TRAILER WITH PIVOTING AND EXTENDABLE TONGUE AND BRUSH GUARD

TECHNICAL FIELD

The present invention relates to the field of trailers used with all terrain vehicles (ATV's) and in particular to a trailer which can be folded up and carried on the rear of the vehicle in a space saving arrangement.

BACKGROUND OF THE INVENTION

Conventional trailers are known to be used for hauling loads or game behind an ATV. Some of these trailers or carts can be hitched to an ATV using a standard two inch receiver holding a ball mount and ball or other means of attachment. Empty trainers are inconvenient to pull or maneuver and they take up unnecessary space upon parking and storing same.

The present invention provides a trailer or cart having an extendable and pivoting tongue arrangement which serves as a conventional tongue for connecting a trailer for carrying a load behind an ATV but allows the trailer to be raised and transported in a space saving position when the trailer is empty.

SUMMARY OF THE INVENTION

The present invention discloses an all terrain vehicle (ATV) trailer and mount which is connectable to a standard two inch receiver so that the trailer can be raised up and held in a space saving arrangement for transport by the ATV or other vehicles such as a pickup truck with a conventional hitch and receiver arrangement. It is contemplated that ball mounts of different sizes, pintle hitch arrangements or forked tongue hitches could be utilized with the vehicle receiver to accommodate different hitch devices can be utilized with the trailer tongue of the present invention. The tongue is telescoping so that it can be shortened before raising the trailer to the space saving position. The ball mount on the ATV tongue includes two plates, one attached to each side of the mount. The plates include a plurality of aligned holes for the attachment of the trailers tongue in a vertical attitude or other selected angle for space saving transport. A keeper comprising pins engages and holds the tongue of the trailer in vertical position within the plates supporting the trailer in an upright position with respect to the ground. With one pin removed, the trailer can be rotated down to ground level. The other pin is then removed permitting the hitching of the trailer to the ATV or other vehicle hitch ball for normal towing and usage. The wheels are provided with heavy duty fenders pivotally mounted on the wheel axles and pivotally rotated if desired to function as sled runners. A keeper can be removed to allow the fenders to be rotated forward and down to be used as sled runners when the ATV is towing a load in the snow. In this position, the keepers are re-installed to keep the fenders in the sled runner position.

At least one preferred embodiment utilizes a longitudinal bar or rod extending from the wheel axle or part of the frame thereby upwardly at an angle to the bottom of the trailer frame to function as a brush guard and stump or rut jumper. The brush guard keeps limbs or brush from catching and/or locking up the wheels and aids in pulling the trailer over small logs, rocks, or gullies which would tend to catch the wheels and aids in navigating through rough terrain.

It is an object of this invention to provide an ATV trailer and tongue mounting arrangement which can be pulled behind the ATV or other vehicle using a standard receiver, ball mount, and ball hitch but will also allow the trailer to be raised to a space saving vertical position and held in place on brackets provided on the ball mount.

It is another object of this invention to provide an ATV trailer with a telescoping tongue wherein the tongue can shortened before the trailer is raised to the space saving position to provide more stability for the ATV in this mode.

It is another object of this invention to provide an ATV trailer with at least two wheels with heavy duty fenders which are pivotally mounted on the wheel axles and can be rotated down and forward and held in place with keepers to be used as sled runners when the trailer is pulled through snow.

It is another object of the present invention to provide brush guard support members mounted before the wheels providing structural support to the frame and runners which function as stump and gully jumpers.

Other objects, features, and advantages of the invention will be apparent with the following detailed description taken in conjunction with the accompanying drawings showing a preferred embodiment of the invention.

For a better understanding of the invention, its operating advantages, and the specific objections obtained by its use, reference should be made to the accompanying drawings and description which related to a preferred embodiment thereof.

BRIEF DESCRIPTION OF THE DRAWINGS

A better understanding of the present invention will be had upon reference to the following description in conjunction with the accompanying drawings in which like numerals refer to like parts throughout the views wherein.

g position held in place on plates fixedly attached to a ball mount which can be connected to a standard 2" receiver attached to an ATV.

Figure 1:
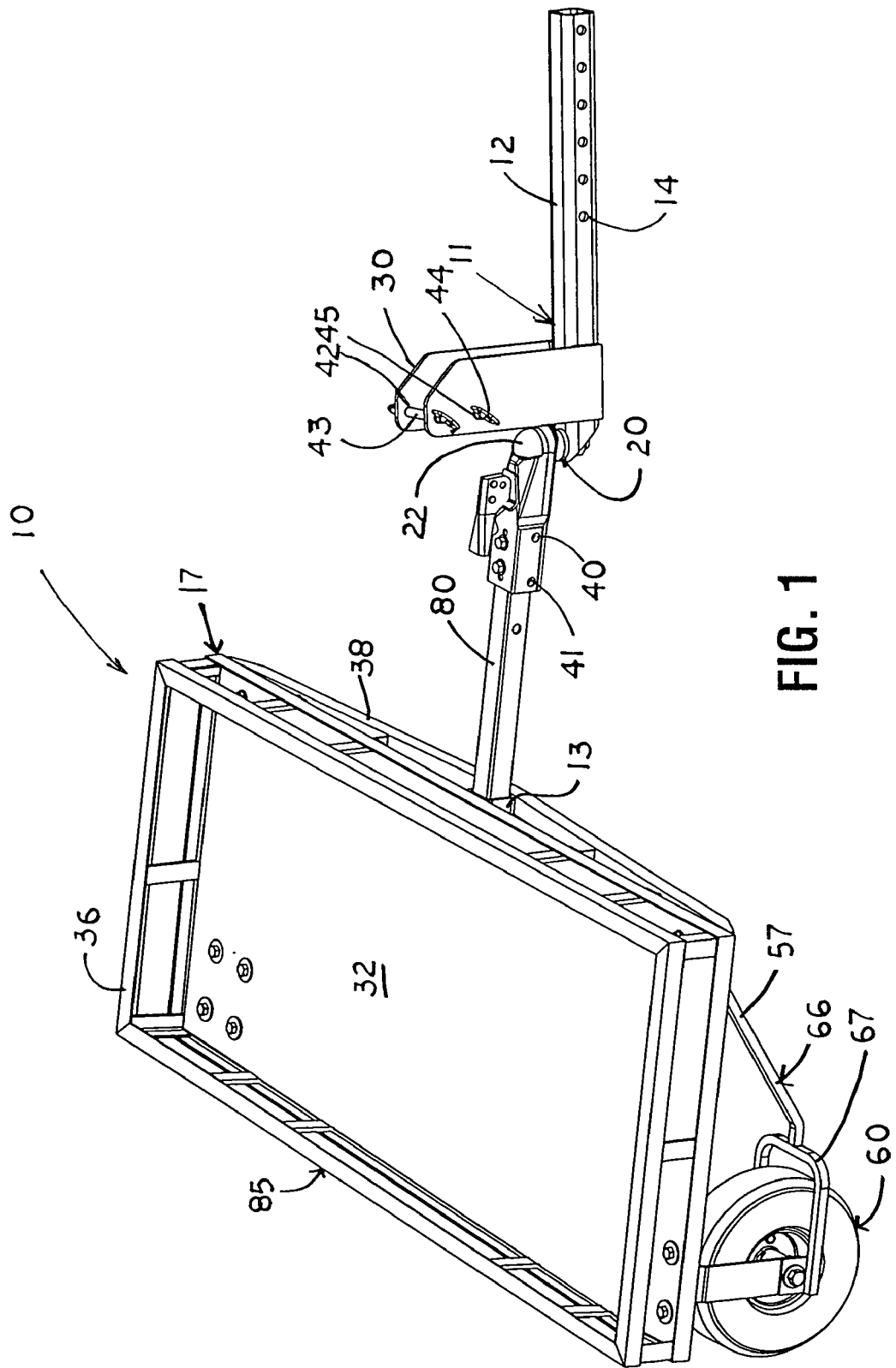
FIG. 1 is a perspective view of a trailer in the extended position showing the tongue extended and mounted to a ball on the distal end of a hitch shaft for insertion into a vehicle receiver.
Figure 2:
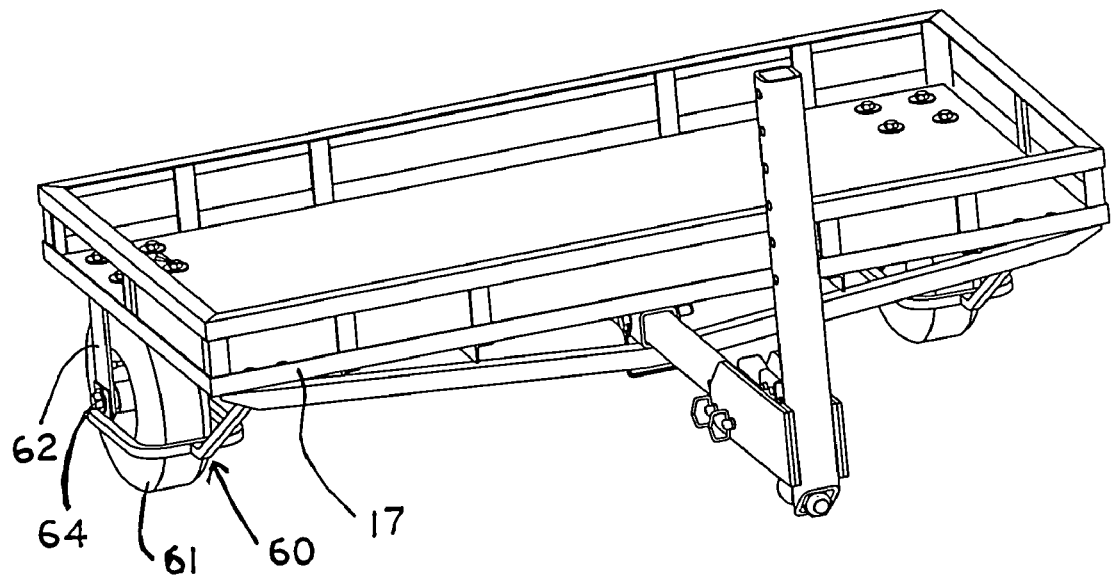

FIG. 2 is a perspective view of the trailer showing the tongue in the collapsed state supported between the plates and pivoted at a right angle to the hitch shaft;.

Figure 3:
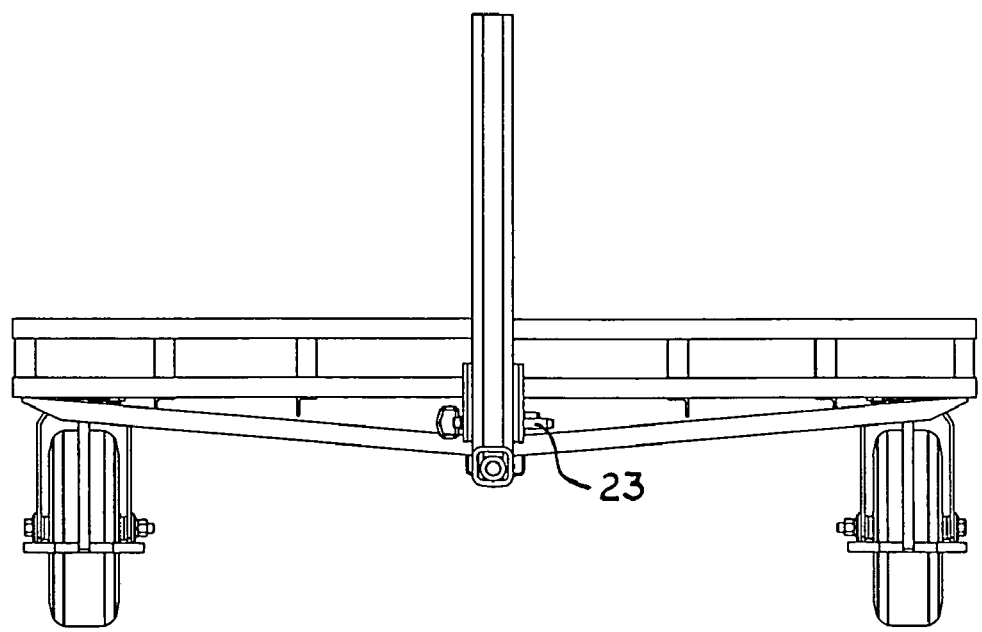
Figure 4:
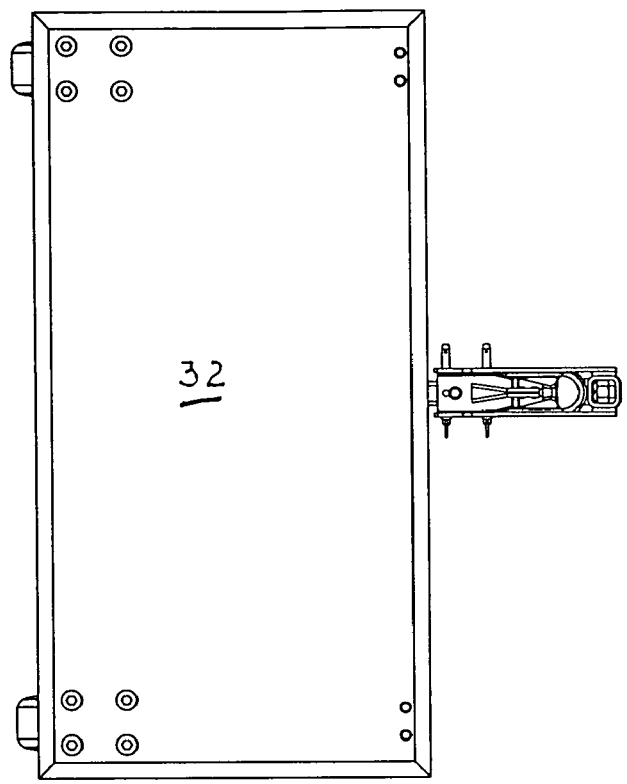
Figure 5:
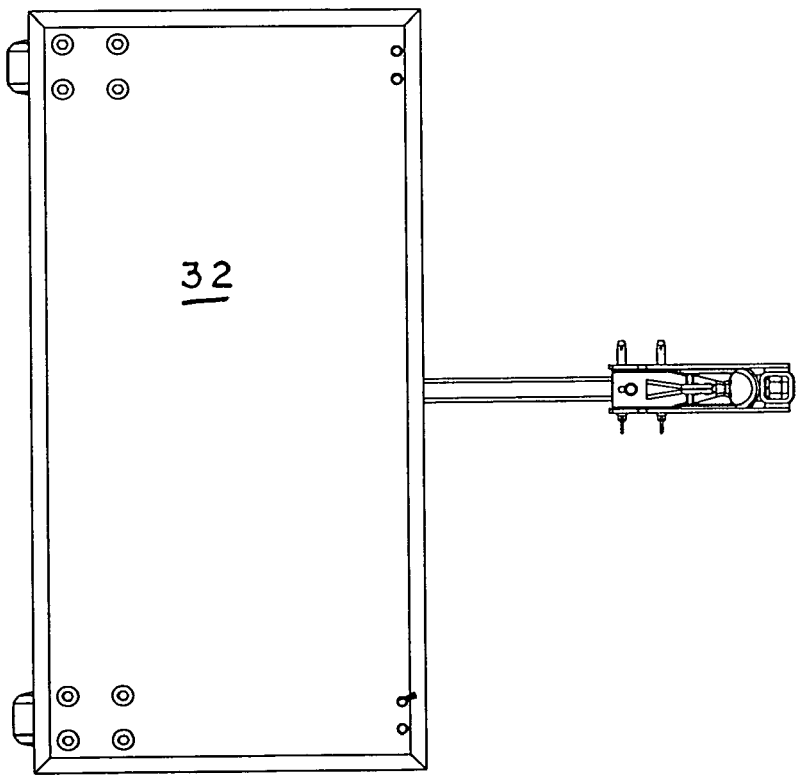
Figure 6:
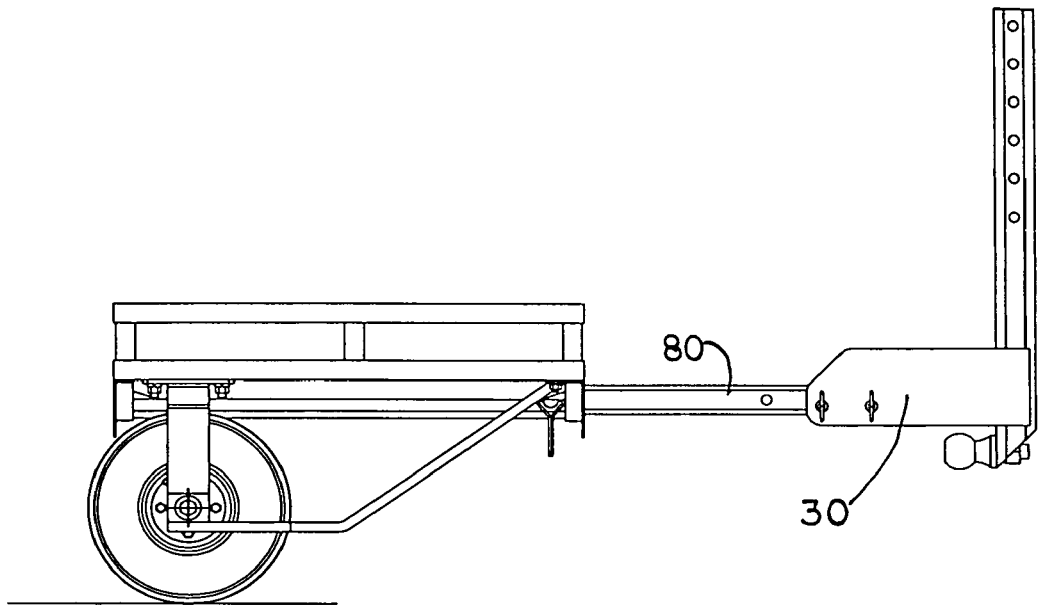
Figure 7:
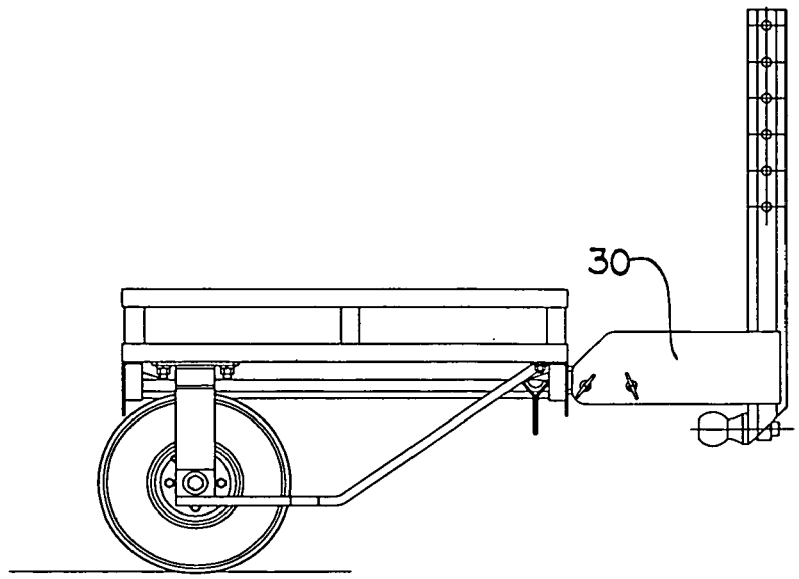
Figure 10:
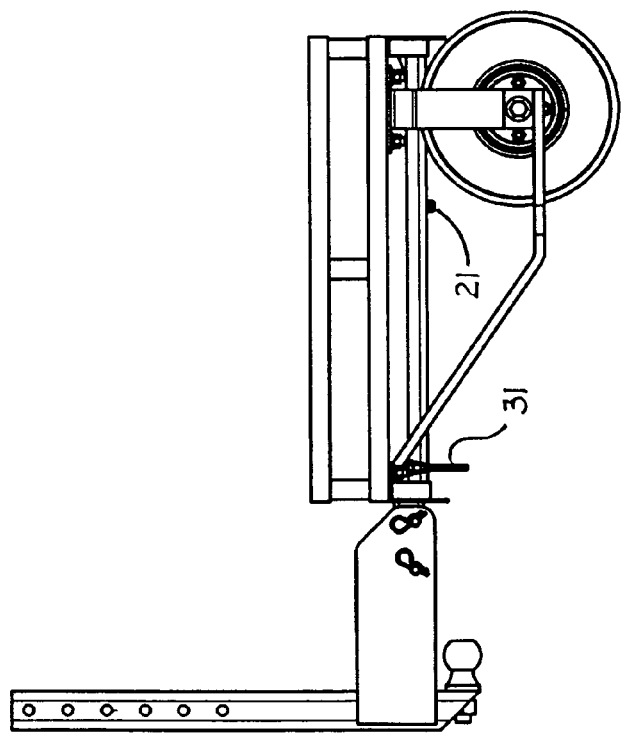
Figure 8:
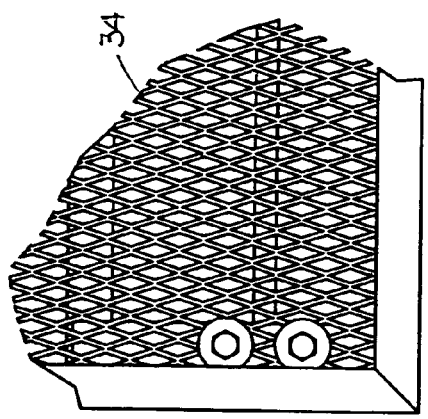
Figure 9:
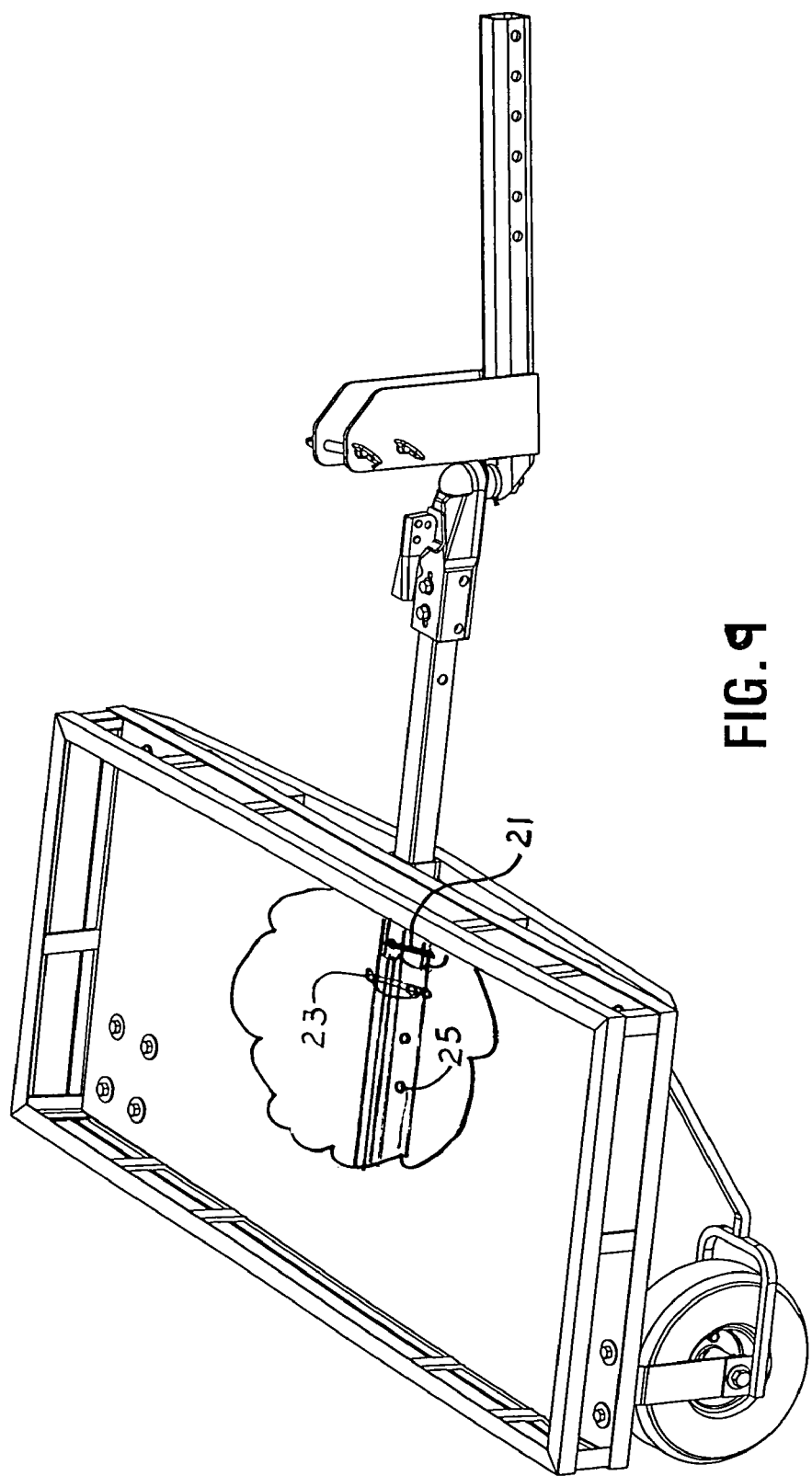
Figure 11:
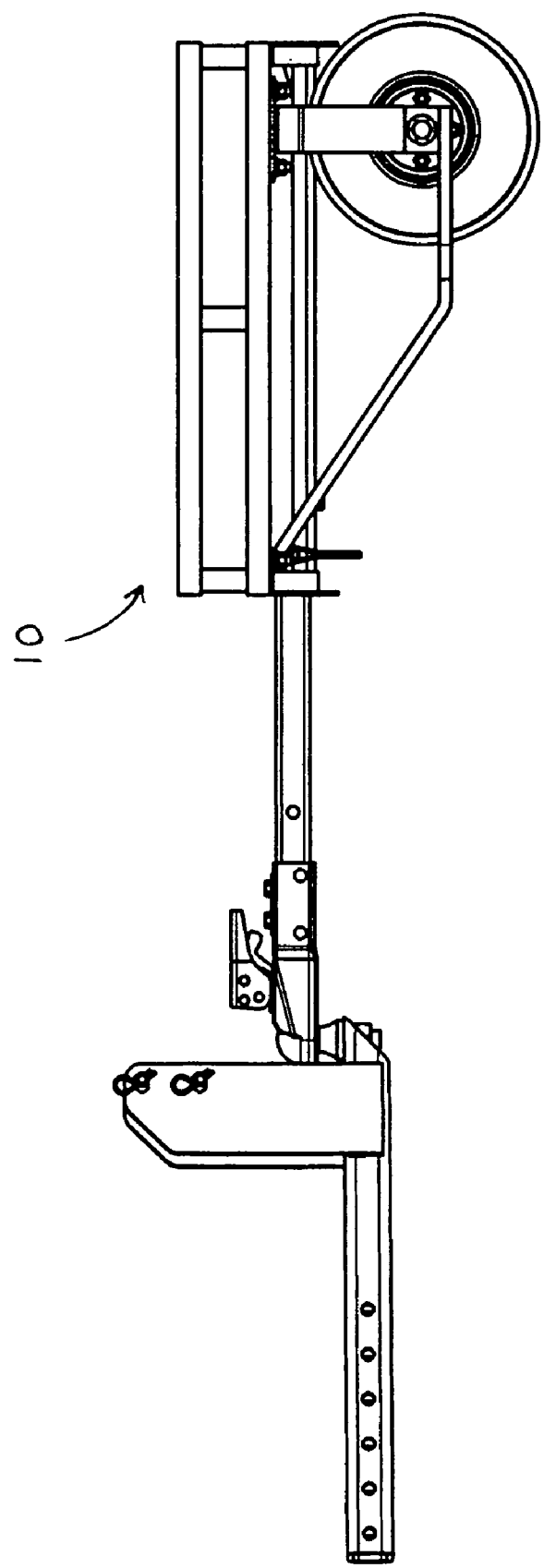
Figure 12:
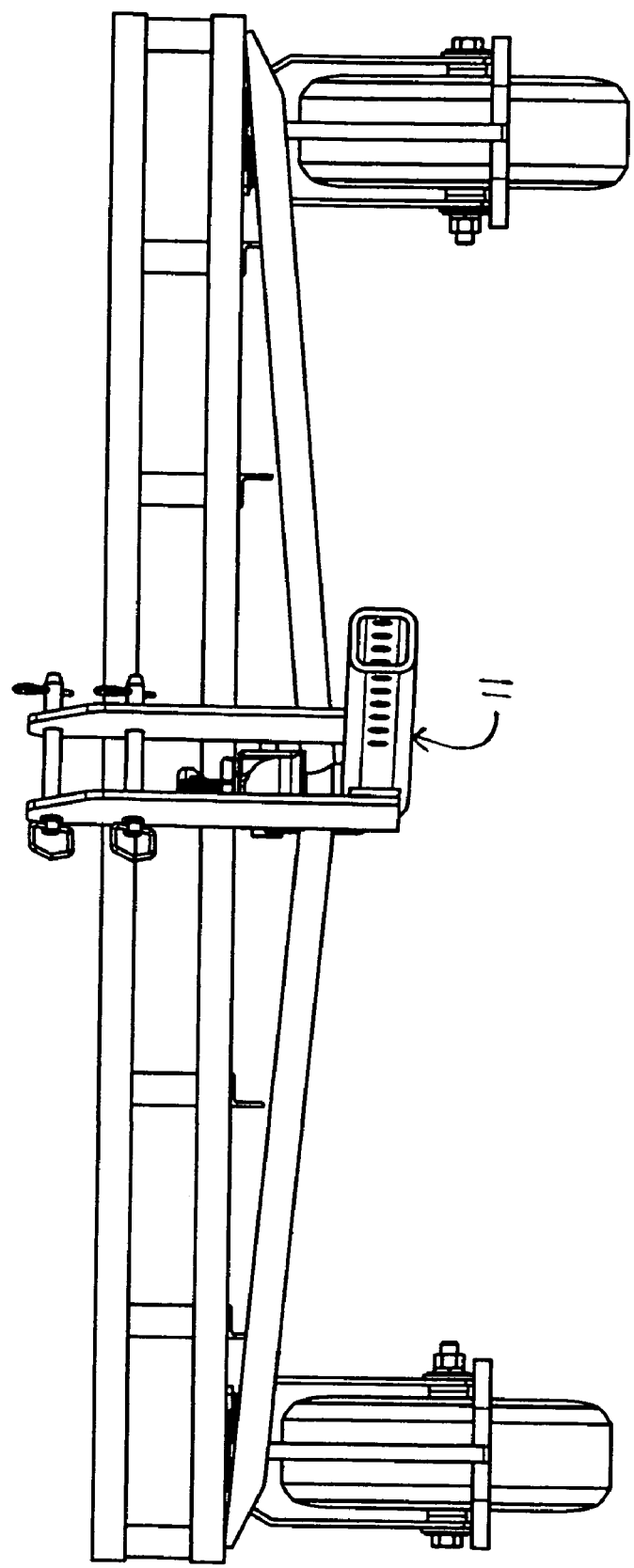
Figure 13:
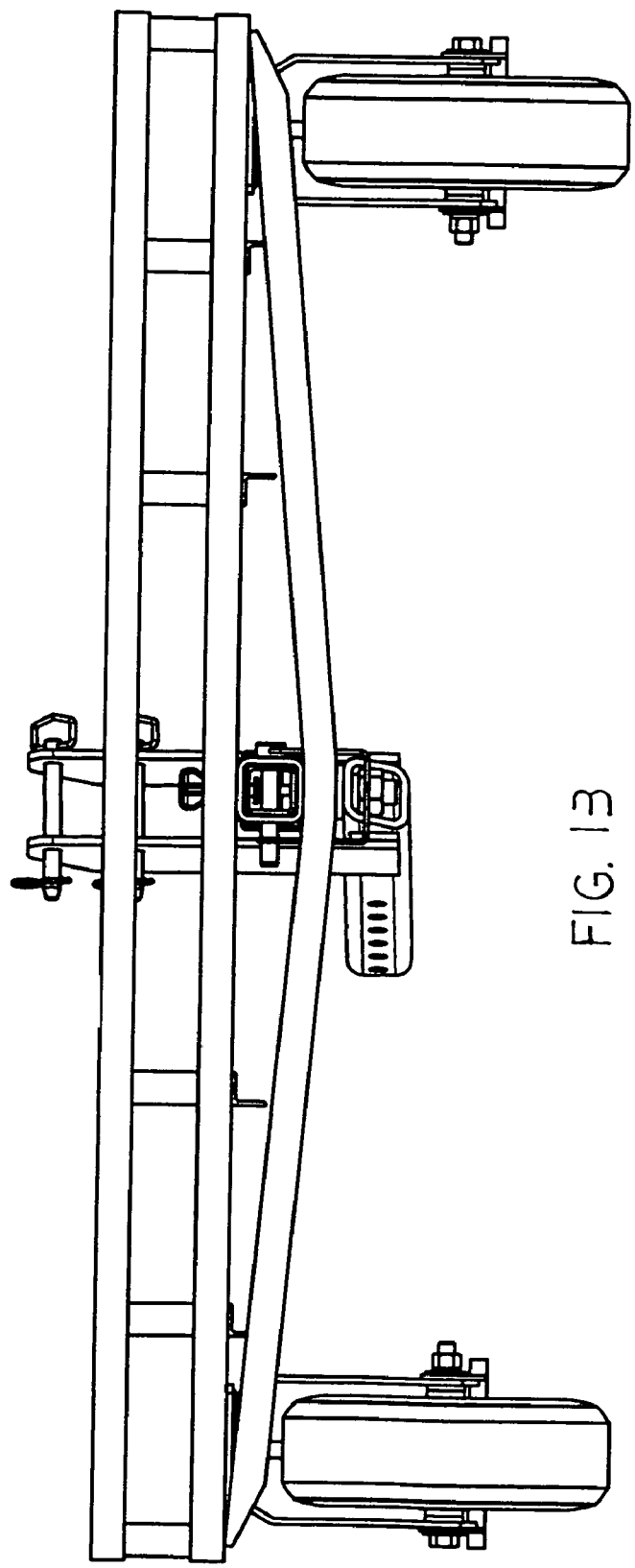
Figure 14:
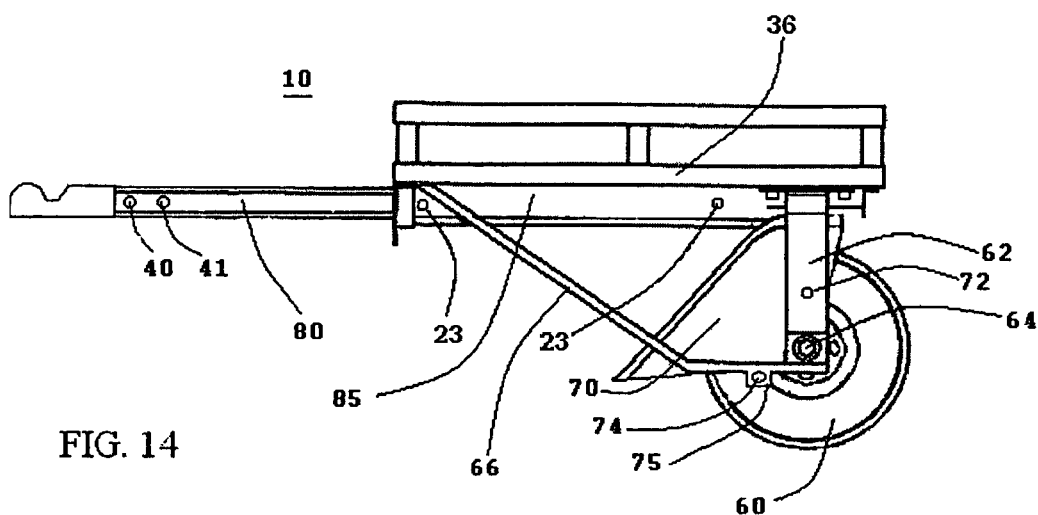
Figure 15:
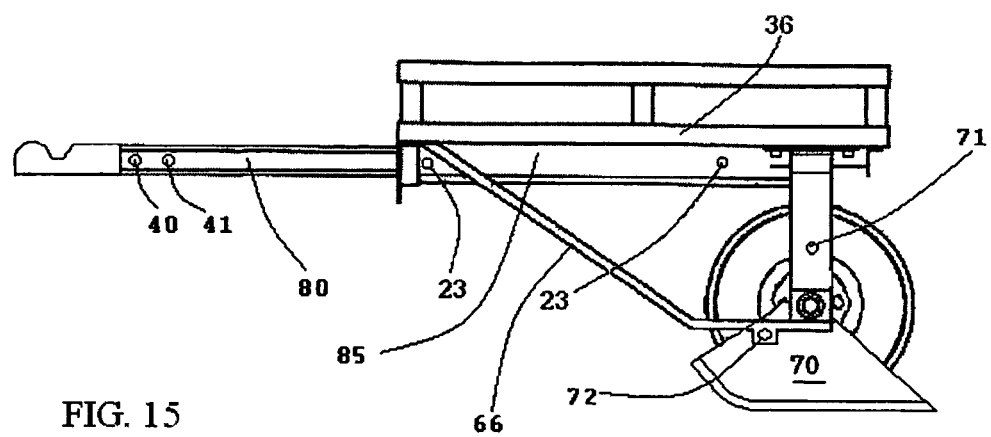

FIG. 3 is a front view of a trailer in the collapsed transport mode;

FIG. 4 is top view of the trailer showing the telescopic tongue in the collapsed state;

FIG. 5 is top view of the trailer showing the telescopic tongue in the extended state;

FIG. 6 is side view of the trailer showing the telescopic tongue in the collapsed state;

FIG. 7 is side view of the trailer showing the telescopic tongue in the extended state;

FIG. 8 is a perspective view of the bed grid;

FIG. 9 is a perspective view of the trailer with the tongue in the extended position showing the stop means in a cutaway view;

FIG. 10 is a side view showing the trailer tongue in the collapsed state and the safety pin;

FIG. 11 is a side view of a trailer in the extended position showing the tongue extended and mounted to a ball on the distal end of a hitch shaft for insertion into a vehicle receiver;

FIG. 12 is a front view of the trailer in the extended position showing the tongue extended and mounted to a ball on the distal end of a hitch shaft for insertion into a vehicle receiver;

FIG. 13 is a rear view of the trailer in the extended position showing the tongue extended and mounted to a ball on the distal end of a hitch shaft for insertion into a vehicle receiver;

FIG. 14 is a side view showing the fender in the up position over the wheel; and FIG. 15 is a side view showing the fender in the down position functioning as a sled runner.

DESCRIPTION OF THE PREFERRED EMBODIMENTS

In accordance with the present invention, there is provided a trailer for pulling a load behind and ATV including a brush guard for navigating through rough terrain and rear wheels positioned extending past the rear frame for backing over logs and through ruts. A proximate portion of the telescoping tongue can slide into a horizontal position beneath the trailer bed. The distal portion of the trailer tongue includes a receiver for a ball and can be pivoted at a 90 degree angle to a pair of mounting plates supported by a hitch shaft for connecting to a vehicle receiver permitting same to be raised up and held in a space saving mode when the trailer is supported vertically on the ball mount connected to the ATV or other vehicle receiver.

As shown in the figures, the ATV utility trailer with pivoting and extendible tongue 10 includes a ball mount unit 11 comprising a shaft 12 including at least one and preferably a plurality of horizontal holes or slots 14 there through for slidable engagement with a receiver of a ATV or other vehicle whereby a retainer pin (not shown) secures the shaft 12 within the receiver having a corresponding horizontal hole or slot therein for removing mounting the shaft 12 to the vehicle receiver. A ball 20 is mounted is on the distal end of the shaft 12 inserted through a vertical hole formed there through. The shaft 12 of the ball mount 11 is placed within a standard two inch receiver fixedly mounted on the rear frame of an ATV or other vehicle. A pair of holding members comprising at least one plate and preferably two parallel spaced apart plates 30 are attached to the sides of the shaft 12 extending upwards a selected distance from the sides of the shaft and spaced inwardly from the distal end at a selected position to allow a ball receiver 22 of a tongue 80 to rotatably mount thereon. The plates 30 are disposed at least one inch forward of the ball 20. Retaining means comprising a pair of corresponding holes 42 and 45 respectively are disposed at selected spaced apart positions one above the other near the top of each of the plates 30 with hole 42 at about 3 inches above hole 45 for receiving retainer pins 43, 44 disposed there through.

The trailer tongue 80 contains corresponding holes 40 and 41 which are positioned at the same distance as holes 42 and 45. The trailer 10 can be rolled forward and the tongue raised to a point where hole 40 of the tongue 80 is aligned with hole 45 of the flanges or plates 30. A pin 43 is placed into both holes in the plates 30 fastening trailer 10 to ball mount 11. The trailer 10 is then rotated upward and raised up to align hole 41 with hole 42 and pin 44 is inserted thorough the plate 30, hole 41 and plate 30 to hold the trailer 10 in an upright space saving transport position.

The tongue 80 is telescoping and extends from a under the trailer 10 and is slidably supported by a plurality of brackets or coaxially by one or more lengths of correspondingly sized tubing 13 mounted to the underside of the trailer frame 17. The rectangular frame 17 comprises a plurality of longitudinal round pipe or rods, square tubing, and/or angle iron shaped members which may be formed of steel, aluminum, fiberglass, graphite, plastic, or combinations thereof. One preferred embodiment is formed of steel. The flat surface of bed of the trailer 10 can be formed of steel, aluminum, fiberglass, graphite, plastic, wood, cloth, canvas, rope, straps or combinations thereof. The bed 32 can be a solid piece of material or formed of strips of material allowing drainage of liquid there through. One preferred embodiment, utilizes a steel grid pattern 34 as best shown in FIG. 8. Side rails or racks 36 may be formed and welded to the frame 10 or removably attached by way of hinges or standards which extend into slots formed in the bed 32 surface or frame 10 in order to form a box frame 85.

The tongue 80 is supported by frame support member 38 to aid in lateral stability. As shown best in FIGS. 9 and 10, a retaining bolt or stud 21 is inserted through the tongue 80 and slidably moves with the tongue 80 within a longitudinal slot formed in the tongue support member 13 when it is telescoped from a collapsed to an extended position in order to abut the frame of the trailer 10 in the extended position to act as a stop means. Another retainer pin such as a spring clip 23 can be inserted through a selected one of a plurality of alignable holes 25 formed horizontally through the tongue 80 and tongue support member 13 to adjust the length of the telescoping tongue 80 and hold it in position. A safety pin 31 may be used to quickly collapse the tongue within the draw tube to lower the center of gravity when necessary.

The trailer 10 includes dolly wheels 60 with pneumatic tires 61, each one mounted independently on to an axle 64 supported by a wheel frame 62 rotatably mounted to the underside of the trailer frame 17. Of course, it is contemplated that a solid axle could be used to mount the wheels thereon; however, the clearance would be reduced and brush or other objects may catch on a solid axle in woody terrain. A preferred embodiment includes support members 66 extending from the inside or outside of the axle 64 to a selected point near the front of the underside of the frame 17 to provide stability and strength to the wheel arrangement and hold the dolly wheels 60 in a forward alignment with the frame 17. The tires 61 extended pass the rear of the frame 17 in order to facilitate backing up an embankment, over a log, or through a gully.

At least one preferred embodiment includes an optional pair of brush guard support members 66 mounted before the wheels providing structural support to the frame and runners which function as stump and gully jumpers. The brush guards 66 comprises one or more longitudinal bars or rods extending from the wheel axle or a part of the frame 17 adjacent thereto and extend upwardly at an angle to the bottom of the trailer frame 17 to function as a brush guard and stump or rut jumper. As shown in the figures, the brush guard on a preferred embodiment consist of a rod 57 extending from the underside of the front end of the frame 17 at a selected angle downward toward the axle 64 where it bends to extend horizontal with the ground and splits to form a "U-shaped" fork 67 with the distal ends attaching to the axle 64 on each side of the wheel. The brush guard keeps limbs or brush from catching and/or locking up the wheels and aids in pulling the trailer over small logs, rocks, or gullies which would tend to catch the wheels.

Optionally, as illustrated in FIGS. 14 and 15, a fender 70 can be mounted rotatably on axle 64. Pin 72 holds fender 70 in bracket 62 during normal use. Bracket 75 containing aperture 74 is attached to brush guard 66. Pin 72 is removed from bracket 62 and fender 70 is rotated forward and down so that pin 72 can be placed through aperture 74 and into a hole in fender 70 for holding it in the sled runner position.

The foregoing detailed description is given primarily for clearness of understanding and no unnecessary limitations are to be understood therefrom, for modification will become obvious to those skilled in the art upon reading this disclosure and may be made upon departing from the spirit of the invention and scope of the appended claims. Accordingly, this invention is not intended to be limited by the specific exemplification presented herein above. Rather, what is intended to be covered is within the spirit and scope of the appended claims.

I claim:

1. An all terrain vehicle trailer system for attaching to a standard two inche receiver comprising: a ball mount unit
   including a two inch square tube which is at least fifteen inches long, a ball fixedly mounted at an end of said two inch square piece, and two plates at least sixteen inches in height, at least three inches in width and at least one quarter inch thick fixedly mounted at least one inch forward of said ball, one on each side vertically mounted and each having two bores therein, a first bore approximately one inch below the top edge of said plates and a second bore at least three inches directly below said first bore; and
   a trailer unit comprising a bed, a telescoping tongue, said tongue having a ball coupling on a first end and having formed therein two bores for aligning with said bores in said two plates, two pins for inserting into said aligned bores and holding said trailer unit vertically, a box metal tube attached to said bed into which said tongue retracts and extends, two wheel brackets and axles fixedly attached to said bed, two wheels rotatably mounted on said axles, and brush guards bracing each of said wheel brackets to said bed.

2. The all terrain vehicle trailer system in claim 1 further comprising:
   two fenders rotatably mounted onto said axles and having a first aperture in a side portion thereof, said brush guard containing a bracket wherein is formed a second aperture capable of having a pin simultaneously inserted through it and said first aperture within said fender when said fender is rotated down into a sled runner position.

3. The all terrain vehicle trailer system in claim 1 wherein said trailer unit is fabricated from material consisting essentially of steel, aluminum or plastic.

4. An all terrain vehicle trailer kit comprising: a ball mount unit for mounting onto an all terrain vehicle receiver including a square tube, a ball fixedly mounted at an end of said square tube, and two plates mounted at least one inch forward of said ball, one on each side vertically mounted and each having two bores therein, a first bore approximately one inch below the top edge of said plates and a second bore at least three inches below said first bore; and a trailer unit comprising a bed, a telescoping tongue, said tongue having a ball coupling on a first end and having formed therein two bores for aligning with said bores in said two plates, two pins for inserting into said aligned bores and holding said trailer unit vertically, a box metal tube attached to said bed into which said tongue retracts and extends, two wheel brackets and axles fixedly attached to said bed, two wheels rotatably mounted on said axles, and brush guards bracing each of said wheel brackets to said bed.

5. The all terrain vehicle trailer kit in claim 4 further comprising:
   two fenders rotatably mounted onto said axles and having a first aperture in a side portion thereof, said brush guard containing a bracket wherein is formed a second aperture capable of having a pin simultaneously inserted through it and said first aperture within said fender when said fender is rotated down into a sled runner position.

6. The all terrain vehicle trailer kit in claim 4 wherein said trailer unit is fabricated from material consisting essentially of steel, aluminum or plastic.

\* \* \* \* \*